(12) United States Patent
Zhang et al.

(10) Patent No.: US 11,165,330 B2
(45) Date of Patent: Nov. 2, 2021

(54) ELIMINATION OF COMMUTATION FAILURE OF LCC HVDC SYSTEM

(71) Applicant: The University of Birmingham, Birmingham (GB)

(72) Inventors: Xiao-Ping Zhang, Birmingham (GB); Ying Xue, Birmingham (GB)

(73) Assignee: The University of Birmingham, Birmingham (GB)

( * ) Notice: Subject to any disclaimer, the term of this patent is extended or adjusted under 35 U.S.C. 154(b) by 0 days.

(21) Appl. No.: 16/629,389

(22) PCT Filed: Jul. 5, 2018

(86) PCT No.: PCT/GB2018/051894
§ 371 (c)(1),
(2) Date: Jan. 8, 2020

(87) PCT Pub. No.: WO2019/012250
PCT Pub. Date: Jan. 17, 2019

(65) Prior Publication Data
US 2020/0177071 A1 Jun. 4, 2020

(30) Foreign Application Priority Data
Jul. 13, 2017 (GB) ..................... 1711298

(51) Int. Cl.
*H02M 1/12* (2006.01)
*H02J 3/36* (2006.01)
*H02M 7/757* (2006.01)
(52) U.S. Cl.
CPC ............. *H02M 1/126* (2013.01); *H02J 3/36* (2013.01); *H02M 7/7575* (2013.01); *H02J 2003/365* (2013.01)

(58) Field of Classification Search
CPC ........ H02M 1/126; H02M 7/7575; H02J 3/36; H02J 2003/365
See application file for complete search history.

(56) References Cited

U.S. PATENT DOCUMENTS 3,768,001 A 10/1973 Thorborg
4,308,575 A * 12/1981 Mase ................. H02J 1/02
174/DIG. 17

(Continued)

FOREIGN PATENT DOCUMENTS

| CN | 102969732 | 3/2013 |
|---|---|---|
| CN | 203398986 | 1/2014 |

(Continued)

*Primary Examiner* — Fred E Finch, III
(74) *Attorney, Agent, or Firm* — Wells St, John P.S.

(57) ABSTRACT

The disclosure relates to a line commutated converter, LCC, for a high-voltage direct current, HVDC, power converter. The LCC comprises at least one bridge circuit for connection to at least one terminal of a DC system. Each bridge circuit comprises at least two arms, and each arm is associated with a phase of an AC system. Each arm comprises one or more upper thyristor valves and one or more lower thyristor valves connected in series, and a branch extending from between the upper and lower thyristor valves. Each arm further comprises a parallel capacitor module comprising at least one parallel capacitor being connected in parallel between at least one pair of branches comprising a first branch and a second branch wherein during commutation of a flow of current in the first branch to a flow of current in the second branch, the at least one parallel capacitor is configured to discharge current in to the second branch in the same direction as the flow of current in the second branch.

20 Claims, 11 Drawing Sheets

(56) References Cited

U.S. PATENT DOCUMENTS

| | | | |
|---|---|---|---|
| 4,340,921 A * | 7/1982 | Lasseter | H02H 7/268 |
| | | | 361/111 |
| 5,396,411 A | 3/1995 | Konishi et al. | |
| 7,262,982 B2 | 8/2007 | Kurosawa | |
| 2007/0133235 A1 | 6/2007 | Kurosawa | |
| 2007/0279947 A1 | 12/2007 | Brandt et al. | |
| 2012/0250371 A1 * | 10/2012 | Fischer De Toledo | H02J 3/16 |
| | | | 363/35 |
| 2012/0313728 A1 | 12/2012 | Cairo, Jr. | |
| 2014/0078622 A1 * | 3/2014 | Crane | H02H 3/087 |
| | | | 361/8 |
| 2014/0146582 A1 * | 5/2014 | Gupta | H02M 7/7575 |
| | | | 363/35 |
| 2014/0268926 A1 * | 9/2014 | Gupta | H02M 1/126 |
| | | | 363/35 |
| 2015/0092459 A1 | 4/2015 | Bergdahl et al. | |
| 2015/0171741 A1 | 6/2015 | Sastry et al. | |
| 2015/0256093 A1 | 9/2015 | Gupta et al. | |
| 2015/0256094 A1 * | 9/2015 | Chaudhuri | H02M 7/5387 |
| | | | 363/35 |
| 2018/0159421 A1 * | 6/2018 | Zhang | H02M 7/7575 |
| 2020/0052611 A1 * | 2/2020 | Zhang | H02M 7/521 |
| 2020/0106258 A1 * | 4/2020 | Mehraeen | H01H 9/54 |

FOREIGN PATENT DOCUMENTS

| | | |
|---|---|---|
| CN | 105634026 | 6/2016 |
| CN | 105656339 | 6/2016 |
| EP | 0616334 | 9/1994 |
| EP | 1962414 | 8/2008 |
| EP | 2975752 | 1/2016 |
| GB | 1395528 | 5/1975 |
| GB | 1711298.8 | 12/2017 |
| JP | S 60-152268 | 6/1985 |
| JP | H 01-129779 | 5/1989 |
| WO | WO PCT/GB2018/051894 | 10/2018 |
| WO | WO PCT/GB2018/061894 | 10/2018 |
| WO | WO PCT/GB2018/051894 | 1/2020 |

* cited by examiner

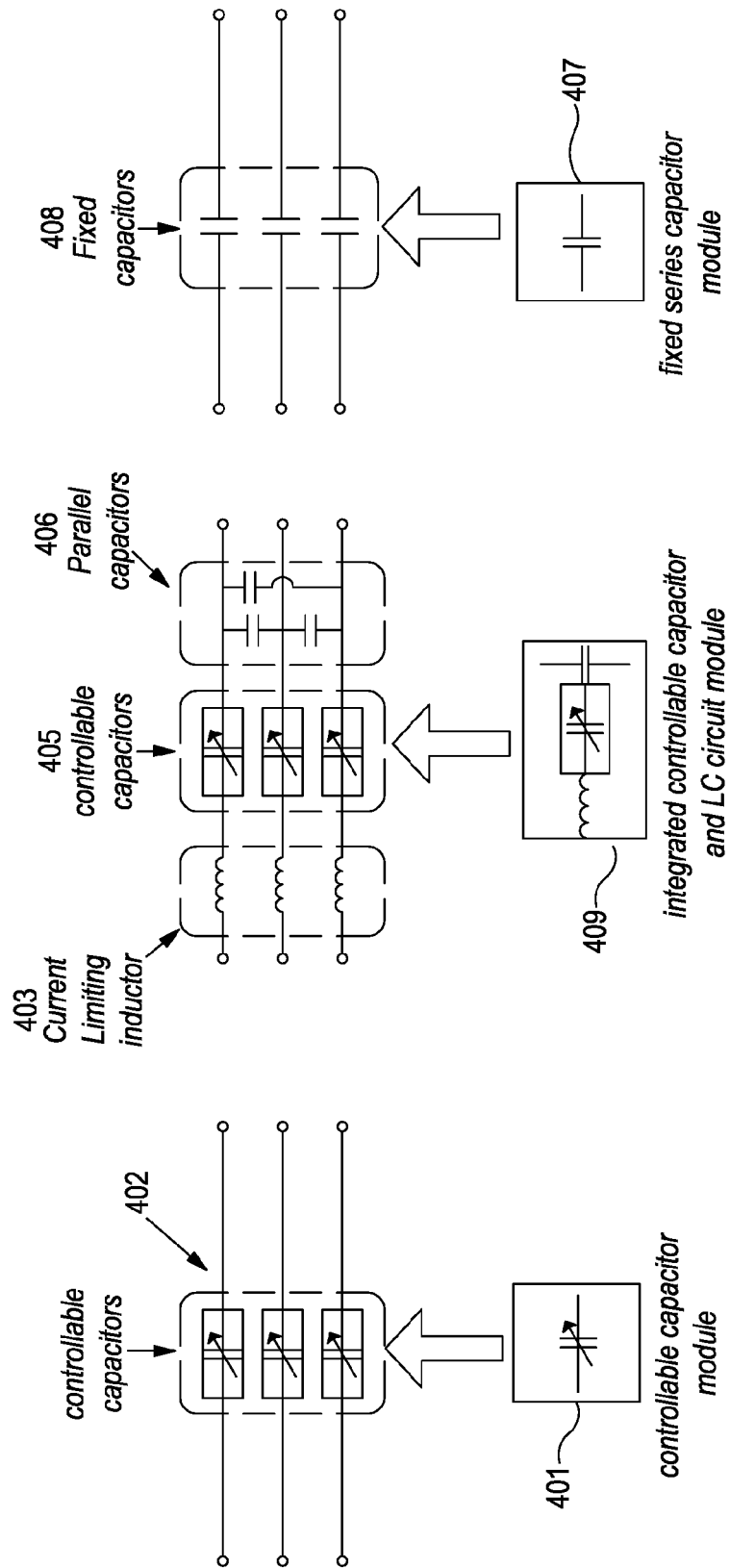

ELIMINATION OF COMMUTATION FAILURE OF LCC HVDC SYSTEM

RELATED PATENT DATA

This application is a 35 U.S.C. § 371 of and claims priority to PCT International Application Number PCT/GB2018/051894, which was filed 5 Jul. 2018 (05.07.2018), was published in English, and which claims priority to GB Patent Application No. 1711298.8, which was filed 13 Jul. 2017 (13.07.2017), the teachings of which are incorporated herein by reference.

FIELD OF THE INVENTION

The present invention relates to power converters, and more particularly to line commutated converters (LCC) for use in high-voltage, Direct Current (HVDC) systems.

BACKGROUND

In a high-voltage, direct current (HVDC) electric power transmission system, direct current (DC) is used for the bulk transmission of electrical power. DC is often preferred for transmitting electric power over long distances, as electrical losses are lower than in corresponding AC transmission systems. Among all the commonly used HVDC technologies, LCC-HVDC has the lowest losses due to the use of thyristors as switching elements. Also, DC transmission line costs over long distances are lower. In addition, LCC-HVDC has the lowest converter station cost. This is mainly because of the much lower cost of thyristors compared with other power electronic switches.

In HVDC, AC is converted to DC (rectification) and reconverted back to AC afterwards (inversion). Typically, line commutated converters (LCC) or voltage source converters (VSC) are used for rectification and inversion. LCC systems are often preferred to VSC systems, as larger power can be transmitted with lower losses using LCC. The maximum power of a VSC system is limited by the power handling capability of power electronic devices. Some examples of power electronic devices include IGBTs (Insulated Gate Bipolar Transistors), IGCTs (Integrated Gate-Commutated Thyristors), GTOs (Gate Turn-off Thyristors), MOSFETs (Metal-Oxide-Semiconductor Field-Effect Transistors), IEGT (Injection-Enhanced Gate Transistor), etc. Recently, LCC-HVDC systems have been used to transmit up to 12 GW of electric power.

However, VSC HVDC systems typically employ transistors such as IGBTs, IGCTs, GTOs, MOSFETs, IEGTs, etc. which can have Gate-Turn-Off capability and can be switched on and off, while LCCs employ thyristors (more precisely thyristor valves) which can only be switched on. A thyristor valve begins conducting when it is forward biased and its gate terminal receives a current trigger, and will continue to conduct until it is no longer forward biased and its conduction current decreases to zero. Because of this, LCC-HVDC systems are susceptible to commutation failure during faults on the AC side. As will be understood by the skilled reader, commutation is the process of switching conduction of the DC current from one thyristor valve arm associated with one AC phase to another thyristor valve arm associated with another AC phase. Commutation failure can mean that even after the fault has been cleared, the system may need to be shut down and restarted, potentially leading to blackout.

In LCC HVDC systems, because of the time at which the commutation starts and the duration of the commutation, the current at the AC side of converter lags the voltage and the system consumes reactive power. As a result, significant reactive power compensations, normally between 50%-60% of the transferred active power, are required at both rectifier and inverter side of the LCC HVDC system. These reactive power compensation devices add to both the costs and losses of the LCC HVDC scheme.

In addition, in LCC HVDC systems, due to the switching actions of thyristor valves, significant amount of harmonics are generated at both rectifier and inverter side of the LCC HVDC system. To prevent these harmonics from propagating into the connected AC system, a large number of AC harmonic filters are installed at the AC side of both rectifier and inverter side of the LCC HVDC system as shown in FIG. 1a. These AC harmonic filters add to the costs and losses of the HVDC system as well as the space required for each converter station.

The present invention has been devised with the foregoing in mind.

SUMMARY

According to a first aspect of the present invention, there is provided a line commutated converter, LCC, for a high-voltage direct current, HVDC, power converter. The LCC comprises at least one bridge circuit for connection to at least one terminal of a DC system. Each bridge circuit comprises at least two arms, and each arm is associated with a phase of an AC system. Each arm comprises one or more upper thyristor valves and one or more lower thyristor valves connected in series, and a branch extending from between the upper and lower thyristor valves. Each arm further comprises a parallel capacitor module comprising at least one parallel capacitor being connected in parallel between at least one pair of branches comprising a first branch and a second branch wherein during commutation of a flow of current in the first branch to a flow of current in the second branch, the at least one parallel capacitor is configured to discharge current in to the second branch in the same direction as the flow of current in the second branch.

As will be discussed further below, the discharged current from the parallel capacitor(s) flows in the same direction as the commutation current providing further commutation voltage that assists in the commutation of current between thyristor valves. This reduces the risk of commutation failure.

The parallel capacitor module(s) also generate and export reactive power to the AC network. This provides for the elimination of reactive power compensation devices at the AC side leading to significant cost reductions. Furthermore, the system reacts from a fault at a quicker rate. The reactive power generated by the parallel capacitor(s) is related to the square of the voltage across it. Therefore during recovery, when the AC voltage is building up, the large increase of reactive power generation from the capacitors will speed up fault recovery.

The line commutated converter may further comprise a first controllably insertable capacitor module, wherein the first controllably insertable capacitor module is operable to insert at least one first insertable-series capacitor in series with each branch. As discussed herein, any reference to a "controllably insertable capacitor module" may refer to any number of controllably insertable capacitor modules in a series connection.

The current provided by the discharging parallel capacitors creates a discharge loop that provides for a faster commutation time by reducing the voltage-time area that is required for a successful commutation. This reduces the voltage rating requirement from other components that may be used to increase commutation, such as the insertable-series capacitors. Furthermore, this reduces the probability of commutation failure.

As a result, the total required voltage rating of the controllably insertable capacitor modules is reduced. Therefore, a lower number of controllably insertable capacitor modules are required, and correspondingly there is a lower number of power electronic switches (also referred to as General Circuit Switches "GCS"). This means that there is less power lost due to conduction and switching of the power electronic switches. There is also improved system reliability and reduced capital cost.

The line commutated converter may further comprise an inductor module comprising at least one current limiting inductor in series with each branch. The at least one current limiting inductor may be an at least one current limiting reactor. The inductor module may be configured to reduce the time period taken for commutation between thyristor valves to complete.

The inductor module provides for the speed of commutation to be reduced as this may be desirable in some circumstances. For example, a parameter such as impedance or capacitance of the parallel capacitors may be selected to restrict transmission of harmonic frequencies to the AC system (i.e. achieve acceptable harmonic performance) as discussed further below. This typically results in a very fast speed of commutation. An extremely high speed of commutation can potentially cause damage to the thyristor valves. The current limiting inductor increases the commutation time so that the rate of rise of on-state current due to commutation is not so high to cause damage to components such as the thyristor valves. The combination of the inductor module and parallel capacitor module can improve commutation immunity and component reliability at the same time.

The line commutated converter may further comprise an integrated controllable capacitor LC circuit module comprising the first controllably insertable capacitor module, the inductor module, and the parallel capacitor module.

The line commutated converter may further comprise at least one second controllably insertable capacitor module wherein the second controllably insertable capacitor module is operable to insert at least one second insertable-series capacitor in series with each branch. The second controllably insertable capacitor module may or may not be included within the integrated controllable capacitor LC circuit module.

The line commutated converter may further comprise a fixed capacitor module comprising at least one fixed-series capacitor in series with each branch and configured for generating reactive power. The fixed capacitor module provides for the commutation voltage to be delayed. This provides for a higher steady-state firing angle of the thyristors leading to smaller steady-state reactive power consumption of the converter. Furthermore, there is a higher commutation voltage during fault conditions that reduces the power requirements of other components of the system such as the controllably insertable capacitors (if used).

The bridge circuit of the line commutated converter may be connected to the AC system via a transformer, and each branch may extend beyond the transformer to a connection to at least one terminal of the AC system.

The capacitances of the parallel capacitor modules may be selected so that a first electrical path through the parallel capacitor module has a lower impedance at harmonic frequencies than a second electrical path through the inductor module to the AC system in order to restrict the transmission of harmonic frequencies to the AC system.

The parallel capacitors and inductance created by the transformer provides for significant harmonic reduction in generated AC current. In fact, this harmonic reduction can be more effective than that provided by AC filters that are typically attached to existing LCC HVDC systems. It will be appreciated that AC filters and associated switch yards take up a large proportion of space in converter stations. Utilising the present invention, such AC filters may not be required and this provides for a significant reduction in the space required by a converter station. Furthermore, removal of AC filters provides for a considerable reduction in converter losses, considerable cost-savings and increase of system reliability, and elimination of the potential low-order harmonic resonance problem between AC filter and AC system impedance.

A further advantage is that there is a significant reduction in high-frequency electro-magnetic field generation since the impedance of a parallel capacitor is inversely related to the frequency whilst the impedance of the transformer (acting as an inductor) is proportionally related to the frequency. Therefore the filtering of harmonics is improved as the frequency increases.

The fixed capacitor module may be in series between the transformer and the at least one terminal of the AC system. In other words, the fixed capacitor may be located on the AC side of the transformer. This provides for the commutation voltage to have a favourable phase shift during steady-state and fault conditions. The voltage-time area for commutation is higher when including the fixed series capacitor. This leads to reduced power requirements for other components such as for the controllably insertable-series capacitors (if used). This further reduces cost and power loss, and, reliability of the system is improved.

The AC system associated with the line commutated converter may comprise three phases. Therefore, the parallel capacitor module may comprise three parallel capacitors. A first parallel capacitor may be connected between a first branch and a second branch. A second parallel capacitor may be connected between the second branch and a third branch. A third parallel capacitor may be connected between the first branch and the third branch. Therefore, parallel capacitors are positioned across branches between which commutation takes place.

The line commutated converter may comprise two LCC bridge circuits connected in series, each LCC bridge circuit being a six-pulse bridge circuit having three phases.

The branches may make up a first set of branches, and the line commutated converter may further comprise a second set of branches having the same number of branches as the first set of branches. Each branch of the second set of branches may be connected in parallel with a corresponding branch in the first set of branches and all parallel capacitors connected between branches that are within the same set.

It should be noted that any of the components discussed above that are described as being connected in series with a branch may be connected in series with any branch including in the second set. Furthermore, if there are multiple sets of branches, each set of branches may include a separate module. For example, if there are two sets of branches for each bridge circuit, then there may be two integrated controllable capacitor LC circuit modules for each bridge circuit that correspond with each set of branches.

It is advantageous to have two sets of branches since there is less current flowing through the branches. Therefore components in series with the branch, such as the controllably insertable capacitors may be rated to a lower current rating. Typically, adding a second set of branches will half the current rating required.

According to a second aspect of the invention there is provided a method of operating a line commutated converter as described above. The method comprises the step of discharging current from the at least one parallel capacitor and thereby providing a first additional commutation current.

The method may further comprise the step of inserting at least one insertable-series capacitor in series with each branch during commutation to provide a second additional commutation current.

The line commutating converter may further comprise an inductor module comprising at least one current limiting inductor in series with each branch. The method may further comprise the step of reducing the time period taken for commutation between thyristor valves to complete.

The method may further comprise the step of restricting transmission of harmonic frequencies to the AC system by configuring a first electrical path through the parallel capacitor module to have a lower impedance at the harmonic frequencies than a second electrical path through a transformer to the AC system.

The line commutated converter may further comprise a fixed capacitor module comprising at least one fixed-series capacitor in series with each branch and the method may further comprise the step of generating reactive power using the fixed capacitor module.

The method may further comprise, during an AC fault, one or more of:
 (i) increasing the actual commutation voltage with increased AC fault current;
 (ii) increasing the average DC voltage; and
 (iii) increasing the active power transfer.

The one or more of steps (i), (ii) and (iii) may be performed during an unbalanced AC fault. It is an advantage that the series capacitor minimizes the impact of the AC fault on the DC side. A further advantage is that the actual commutation voltage will be automatically increased when the AC fault current increases, which therefore further minimizes the adverse impact on the DC system.

BRIEF DESCRIPTION OF THE DRAWINGS

FIG. 2a is a circuit diagram showing a controllable capacitor module.

FIG. 2b is a circuit diagram showing an integrated controllable capacitor LC circuit module.

FIG. 2c is a circuit diagram showing a fixed series capacitor module.

DETAILED DESCRIPTION

Figure 1A:
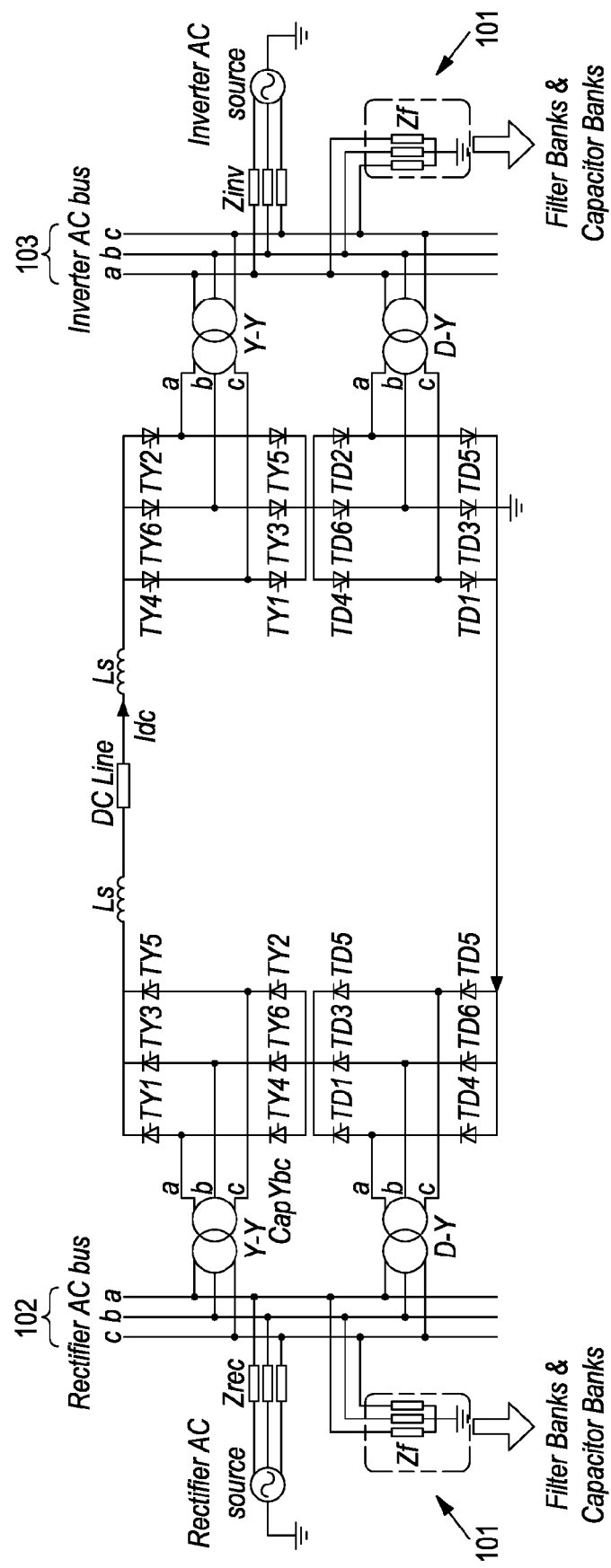
FIG. 1a is a circuit diagram showing a conventional three-phase conventional LCC HVDC system, with filter banks & capacitor banks at both rectifier and inverter sides.

With reference to FIG. 1a there is shown a conventional prior art three-phase line commutated converter (LCC) high voltage direct current (HVDC) system. Filter banks and capacitor banks 101 are shown connected to rectifier AC bus 102 and inverter AC bus 103.

As discussed above, one of the advantages of the invention is that it provides for the removal of filter/capacitor banks 101.

Figure 1B:
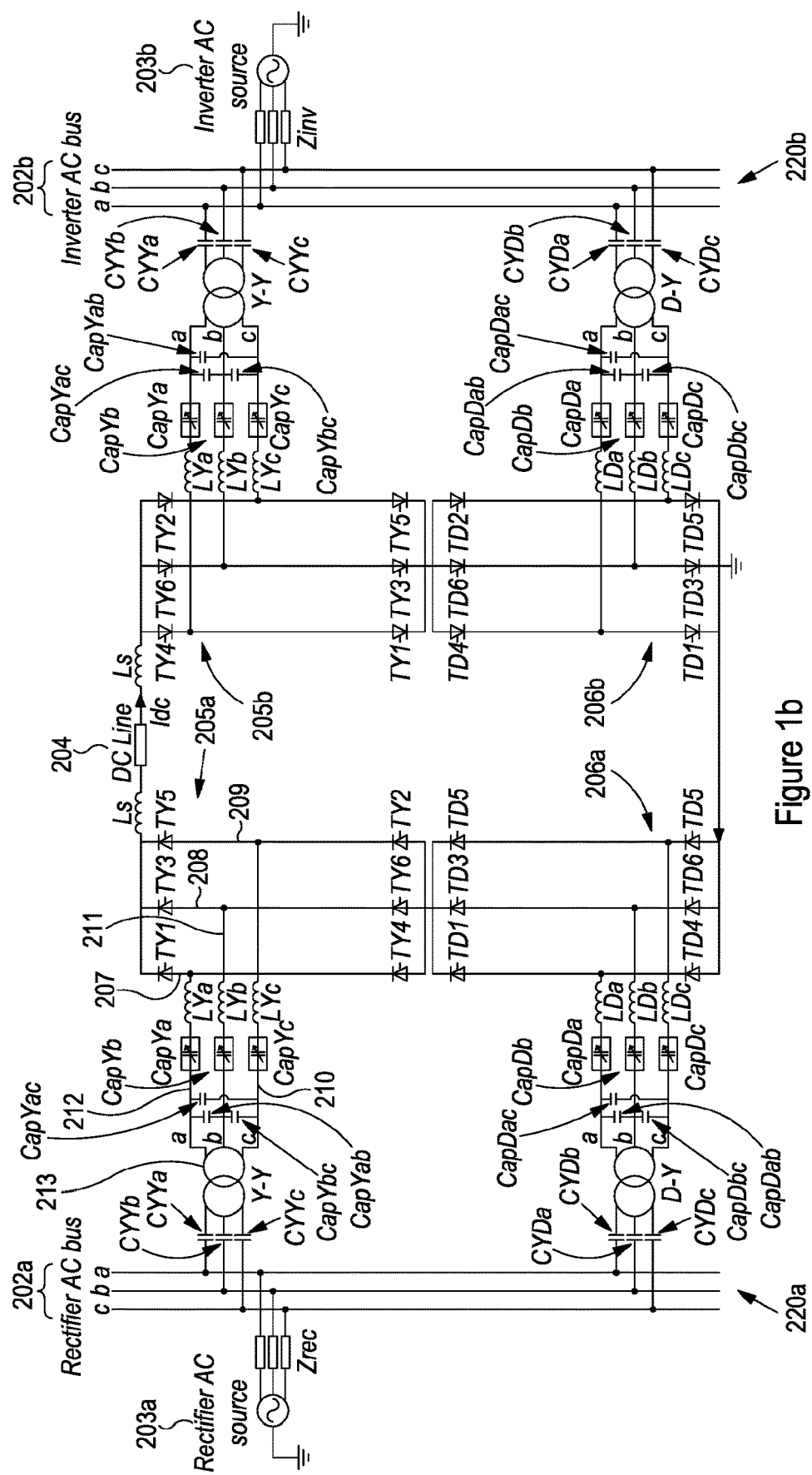
FIG. 1b is a circuit diagram showing a three-phase LCC HVDC system, according to an embodiment of the present invention.

With reference to FIG. 1b there is shown a three-phase LCC HVDC system according to an embodiment of the present invention. The invention encompasses AC systems having a different number of phases. However it is most common for AC transmission systems to utilise three-phase AC as is shown in the Figures and discussed herein.

In the embodiment shown in FIG. 1b, the LCC HVDC system comprises a rectifier 220a and inverter 220b coupled respectively via a rectifier AC bus 202a and an inverter AC bus 202b to rectifier AC source 203a and inverter AC source 203b. The rectifier 220a and inverter 220b are separated by DC line 204. Each of the inverter and rectifier include two 6-pulse bridges 205a, 205b, 206a, 206b that are connected in serial. The shown LCC HVDC system may therefore be regarded as a 12-pulse LCC HVDC system.

The following description with reference to FIG. 1b relates to bridge circuit 205a and the associated branch connections to the rectifier AC bus 202a for simplicity of explanation. The discussed features may analogously be applied to the other bridge circuits (inverter or rectifier side) 205b, 206a, 206b that make up the LCC HVDC system.

Bridge circuit 205a includes arms 207, 208, 209 that each correspond with one phase of the three-phase AC. Each arm includes an upper thyristor valve TY1, TY3, TY5 and a lower thyristor valve TY4, TY6, TY2 connected in series as shown. Each arm is associated with and connected to a branch 210, 211, 212 that extends to AC bus 202a via transformer 213. Transformer 213 may be a wye-wye transformer or a delta-wye transformer. Each branch 210, 211, 212 extends from between the upper thyristor valve TY1, TY3, TY5 and the lower thyristor valve TY4, TY6, TY2 that is connected to the associated arm. For example, branch 212 is connected to arm 207 at a node in between thyristor valve TY4 and TY1.

Various components are connected in series with the branches 210, 211, 212. In the shown embodiment there are controllably insertable-series capacitors CapYa, CapYb, CapYc, parallel capacitors CapYab, CapYac, CapYbc, and fixed-series capacitors CYYa, CYYb, CYYc. In the shown example, fixed series capacitors CYYa, CYYb, CYYc are located on the branches between the transformer 213 and connection to AC bus 202. There are also current limiting inductors LYa, LYb, LYc in series with each branch. Embodiments of the invention typically include parallel capacitors.

Embodiments may include one or more of insertable-series capacitors, fixed-series capacitors and current limiting inductors in addition to the parallel capacitors. The function of these components will be discussed in more detail below.

It will be noted that there are (advantageously) no filter or capacitor banks in FIG. 1b as shown in FIG. 1a for the reasons discussed below.

Figure 1C:
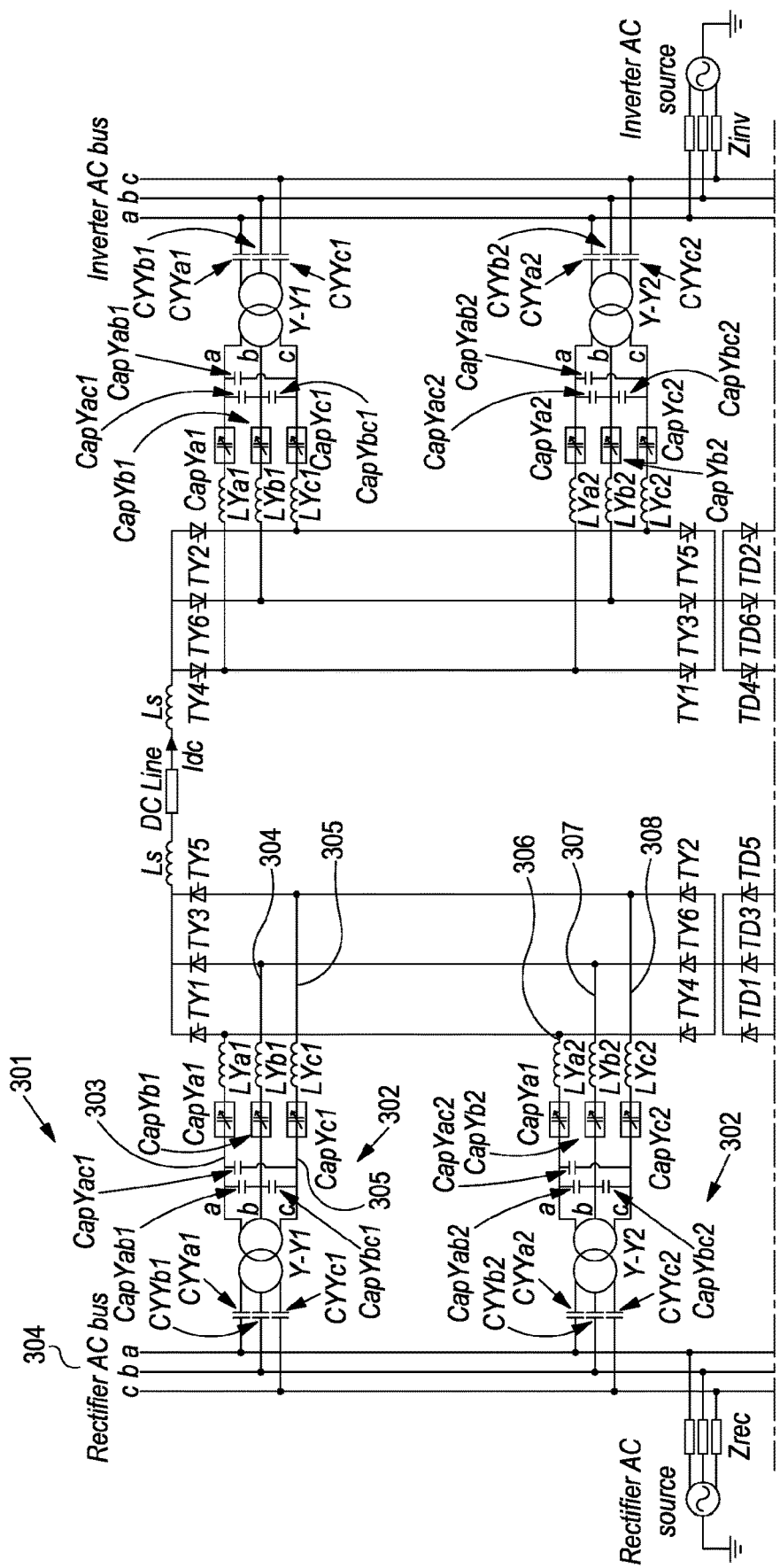
FIG. 1c is a circuit diagram showing a three-phase LCC HVDC system according to an embodiment of the present invention having multiple sets of branches for each bridge circuit.
Figure 1C:
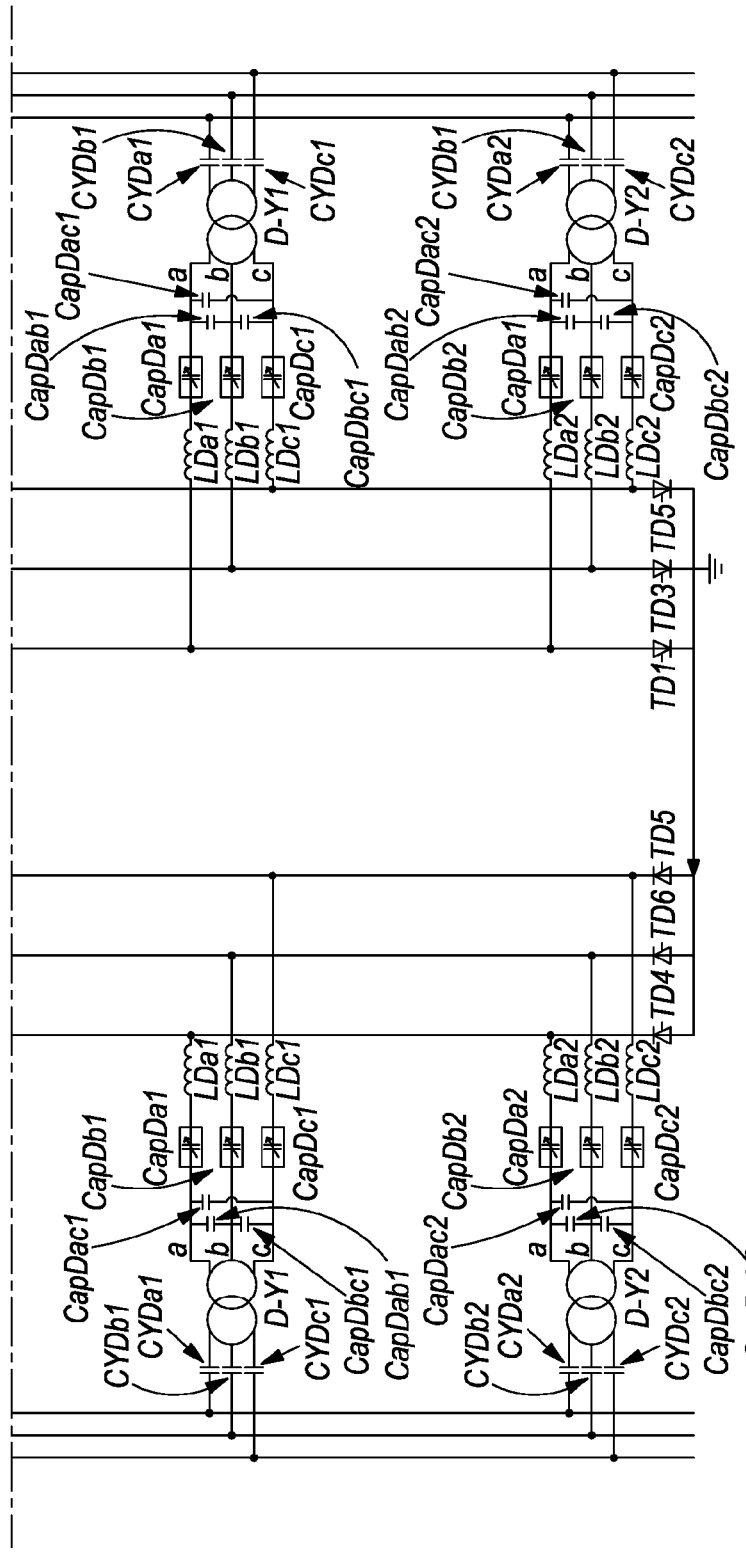

FIG. 1c shows an alternative embodiment where for each phase and associated arm (for each bridge circuit), there are two parallel branches 301 and 302. Each branch has equivalent components as discussed with reference to the branches shown in FIG. 1b. Both parallel branches are connected to the associated arm at nodes that are in between upper thyristors TY1, TY3, TY5 and lower thyristors TY4, TY6, TY2. First set of branches includes branch 303, branch 304, and branch 305. These branches are all associated with a different phase and connect to AC bus 304 via the same transformer Y-Y1. Similarly there is a second set of branches including branch 306, branch 307, and branch 308. Parallel capacitors CapYab1, CapYbc1, CapYac1, CapYab2, CapYbc2, and CapYac2 are connected between branches that are of the same set (i.e. either only between branches in the first set or second set).

The embodiment of FIG. 1c advantageously provides for the current rating of components in the branches to be less (e.g. half) that required compared to the embodiment shown in FIG. 1b.

Figure 6A:
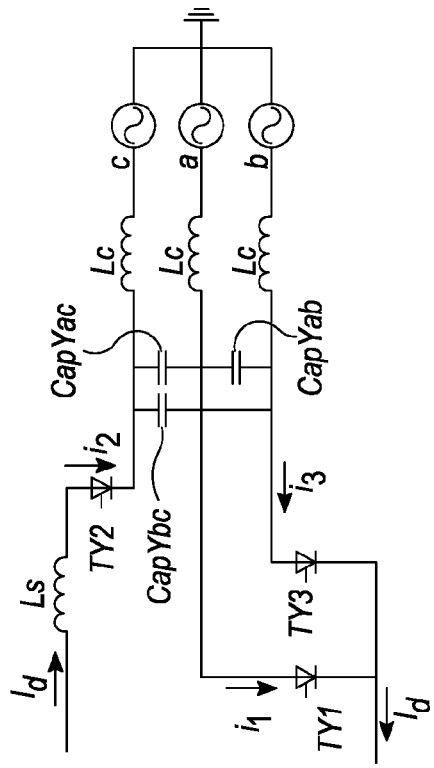
FIG. 6a is a circuit diagram showing an equivalent circuit of commutation according to an embodiment of the present invention including parallel capacitors.

The operation of parallel capacitors CapYab, Cap Yac, Cap Ybc as shown in FIG. 1b is explained below with reference to FIG. 6a. For ease of explanation, other components connected to the branches are not considered. FIG. 6a shows an equivalent circuit of commutation relevant to the commutation from TY1 to TY3. When TY3 is fired, the commutation starts. For the commutation to initiate, the effective commutation voltage (which is the total commutation voltage generated by combining the natural commutation voltage from the AC side and the additional commutation voltage from the inserted-series capacitors) is positive. This means that the voltage across the parallel capacitor CapYab is positive (as shown in FIG. 6a). As a result of CapYab discharging, there is a commutation loop consisting of CapYab, TY3 and TY1. It can be seen that parallel capacitor CapYab has a discharging loop through TY3 and TY1. As this discharging current is in the same direction of the commutation current, the commutation will complete in a much shorter period of time.

FIGS. 2a, 2b, and 2c show some of the possible components that may be connected to the branches in series, or, between different branches as discussed above with reference to FIGS. 1b and 1c.

Figure 4A:
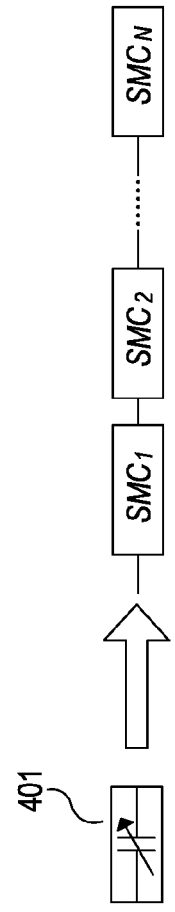
FIGS. 4a and 4b are schematic diagrams showing a controllably insertable capacitor module.
Figure 4B:
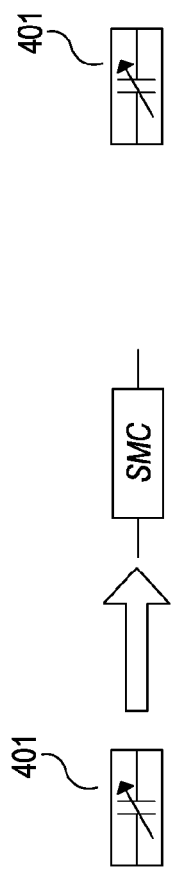

FIG. 2a shows controllably insertable capacitor module 401 that comprises insertable series-capacitors 402. With reference to FIG. 4a there may be a single insertable capacitor module SMC on a branch. With reference to FIG. 4b, the representation of insertable capacitor module 401 may represent multiple controllably insertable capacitor modules SMC1, SMC2 in series with each branch. There may be a sufficient number of controllably insertable capacitor modules to achieve a sufficiently high voltage insertion that is required to eliminate commutation failure and control reactive power. As discussed above, the number of controllably insertable capacitor modules may be advantageously reduced due to the effect of the parallel capacitor module(s).

Figure 7A:
FIG. 7a is the schematic diagram showing a generic circuit switch (GCS).
Figure 7C:
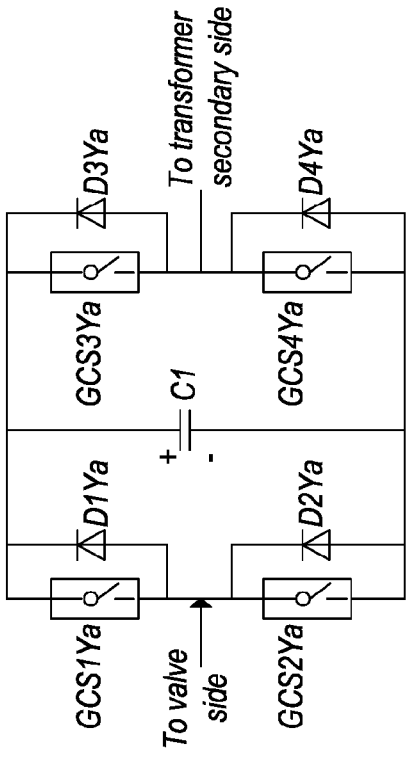
FIG. 7c shows a circuit diagram for a GCS based full-bridge capacitor module in accordance with an embodiment of the present invention.
Figure 7E:
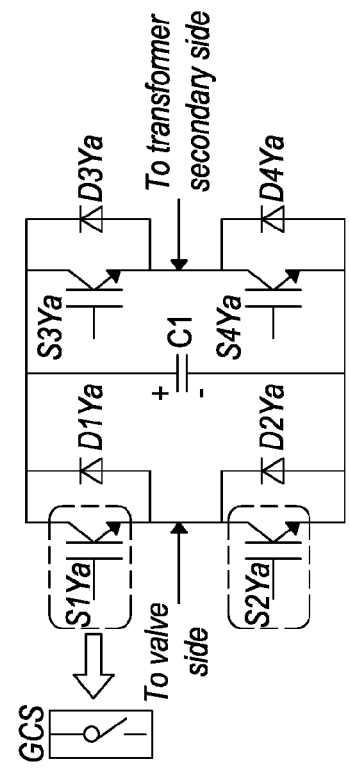
FIG. 7e shows a circuit diagram for a GCS based full-bridge capacitor module using power electronic switches of IGBTs (or IGCTs, GTOs, MOSFETs, IEGTs, etc.) having Gate-Turn-Off capability in accordance with an embodiment of the present invention.
Figure 7B:
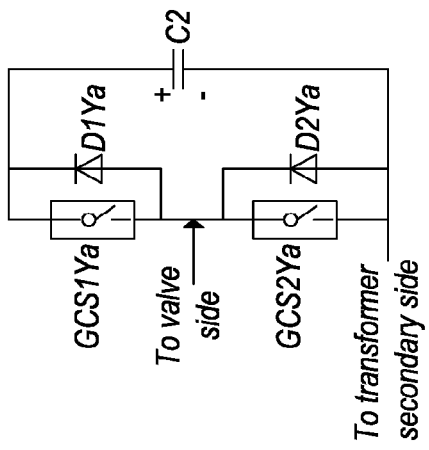
FIG. 7b shows a circuit diagram for a GCS based half-bridge capacitor module in accordance with an embodiment of the present invention.
Figure 7D:
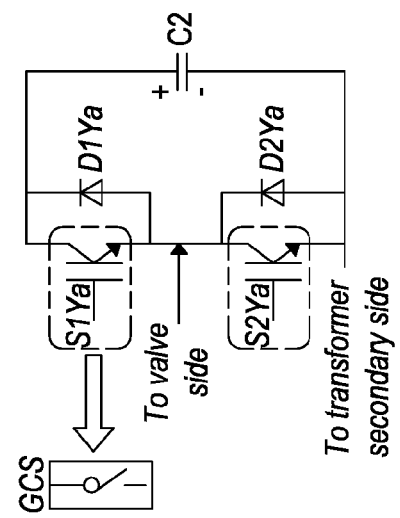
FIG. 7d shows a circuit diagram for a GCS based half-bridge capacitor module using power electronic switches of IGBTs (or IGCTs, GTOs, MOSFETs, IEGTs, etc.) having Gate-Turn-Off capability in accordance with an embodiment of the present invention.
Figure 8A:
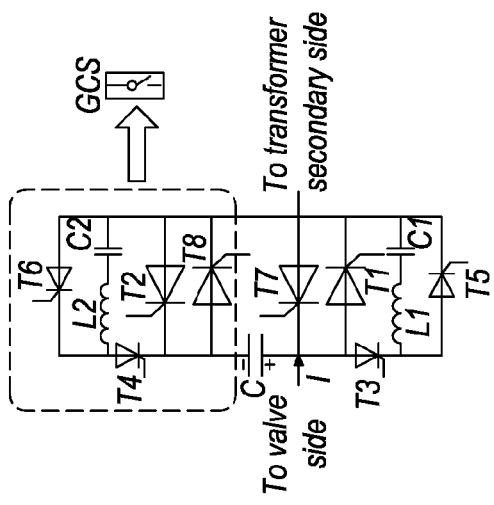
FIG. 8a shows a circuit diagram for a thyristor based half-bridge capacitor module with diodes, which may be employed for the SMC module in accordance with an embodiment of the present invention.
Figure 8B:
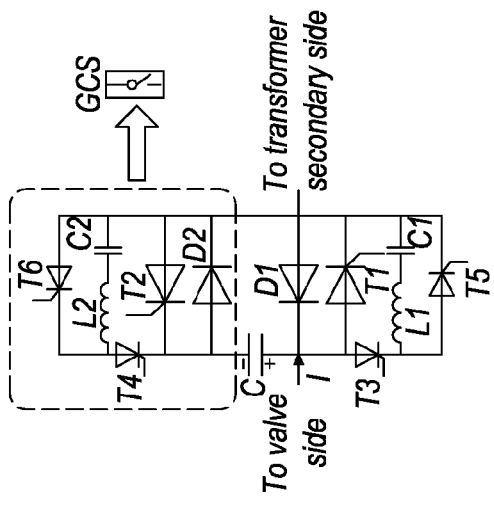
FIG. 8b shows circuit diagram for a thyristor based half-bridge capacitor module without diodes, which may be employed for the SMC module in accordance with an embodiment of the present invention.
Figure 8C:
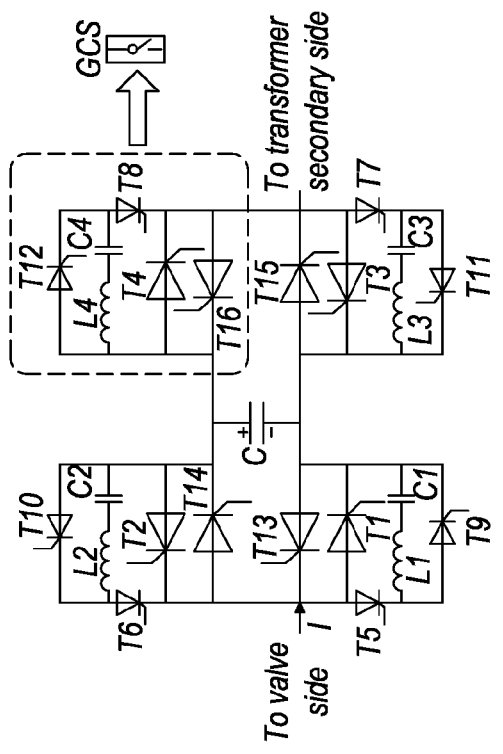
FIG. 8c is circuit diagram for a thyristor based full-bridge capacitor module with diodes, which may be employed for the SMC module in accordance with an embodiment of the present invention.
Figure 8D:
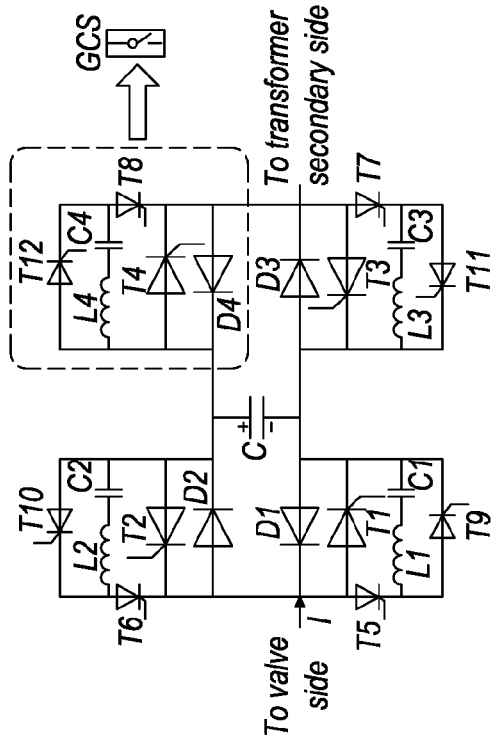
FIG. 8d is circuit diagram for a Thyristor based full-bridge capacitor module without diodes, which may be employed for the SMC module in accordance with an embodiment of the present invention.

Each controllably insertable capacitor module may comprise a half-bridge capacitor switching module as shown in FIG. 7b, or a full-bridge capacitor module as shown in FIG. 7c. With reference to FIGS. 7b, and 7c, general circuit switches (GCS)s GCS1Ya, GCS2Ya, GCS3Ya, GCS4Ya may be any mechanical based or mixed power electronic/mechanical-based switching circuits which can be switched off during non-zero current. The GCSs are operable to direct current to series-capacitors C1, C2. For example, with reference to FIG. 7d and FIG. 7e, the GCSs can be IGBTs. With reference to FIGS. 8a to 8d, the GCSs can be thyristor based circuits. With reference to FIGS. 7a to 8d, all diodes shown in the circuit diagrams could be replaced by thyristors if a higher current rating is required.

The insertion strategy of the insertable-series capacitors with respect to one 6-pulse bridge is used for the purpose of explanation, but it should be appreciated that the same insertion strategy is applicable to insertable-series capacitors for systems with multiple bridges. Detailed insertion strategies are described in WO2016/177991A1, and are briefly described below: In particular, the insertable-series capacitors may be inserted using a "pull", "push" or "push-pull" strategy as set out briefly below.

Push Method

Figure 5A:
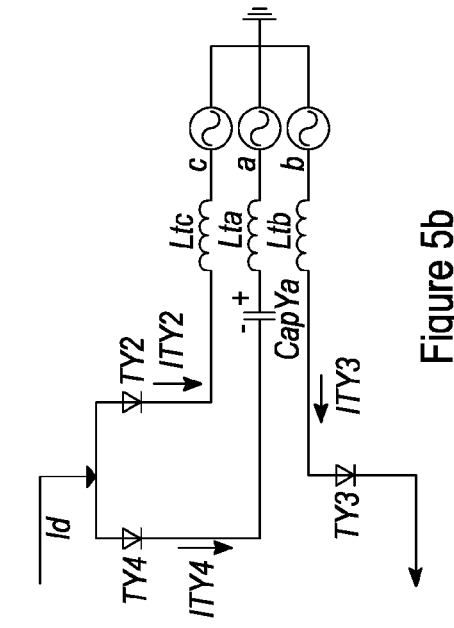
FIG. 5a is a circuit diagram showing an equivalent circuit of commutation according to an embodiment of the present invention in which a "push method" of capacitor insertion is used.

FIG. 5a shows the equivalent circuit of commutation from thyristor valves TY2 to TY4. Before the start of commutation, TY2 and TY3 are conducting, and insertable-series capacitor are bypassed. At the start of commutation, when TY4 is fired, the insertable-series capacitor CapYc at phase C is inserted into the circuit with its positive polarity facing the bridge side (i.e. towards the thyristor valves). The resulting discharged voltage from CapYc pushes current back through TY2 and assists with the commutation. In other words, a negative voltage is applied across thyristor valve TY2 causing it to switch off and stop conducting thus "pushing" the current through thyristor valve TY4. When the commutation is completed, the capacitor voltage is increased. If the commutation is between lower thyristor valves, the insertable-series capacitor connected to the incoming phase will be inserted during commutation and its voltage is reduced at the end of commutation.

Pull Method

Figure 5B:
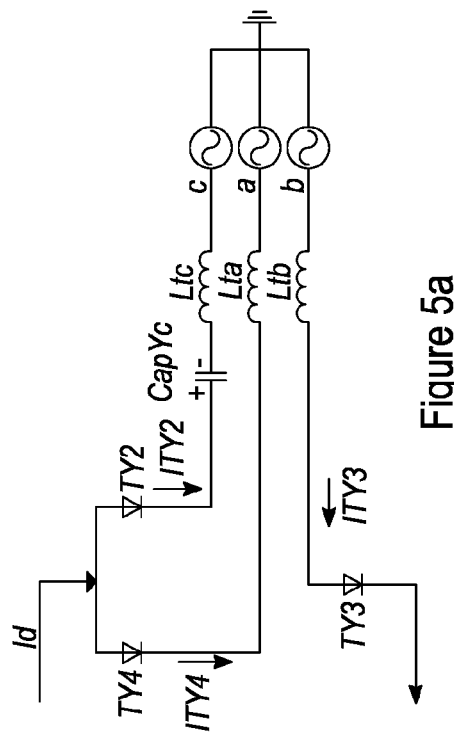
FIG. 5b is a circuit diagram showing an equivalent circuit of commutation according to an embodiment of the present invention in which a "pull method" of capacitor insertion is used.

FIG. 5b shows the equivalent circuit of the same commutation from thyristor valves TY2 to TY4. Unlike push method, when TY4 is fired the insertable-series capacitor CapYa of the incoming valve (TY4 in phase a) is connected with its negative polarity facing the bridge side. The inserted voltage effectively pulls the current through TY4 and helps with the commutation. The capacitor voltage is decreased at the end of commutation. Similarly, if the commutation is between lower valves, the insertable-series capacitor connected to the outgoing phase is inserted and its voltage is increased at the end of commutation.

Push-Pull Method

Figure 5C:
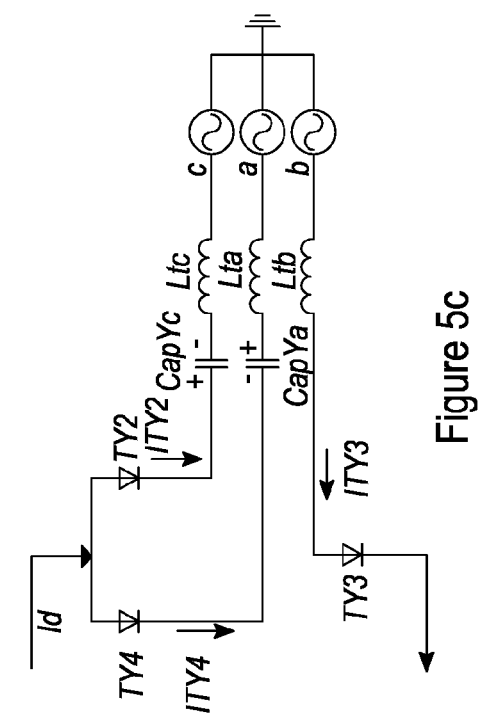
FIG. 5c is a circuit diagram showing an equivalent circuit of commutation according to an embodiment of the present invention in which a "push-pull method" of capacitor insertion is used.

FIG. 5c shows the equivalent circuit of the same commutation from thyristor valves TY2 to TY4. For the push-pull method, insertable-series capacitors CapYc, CapYa connected to both incoming and outgoing phases will be inserted, with the insertion polarity the same as push and pull methods. Both inserted capacitors help with the commutation. At the end of commutation the capacitor voltage is decreased for the insertable-series capacitor at incoming phase CapYa, and the capacitor voltage is increased for the insertable-series capacitor CapYc at outgoing phase. If the commutation is between lower thyristor valves, the insertable-series capacitors at incoming and outgoing phases will behave the same as those for the pull method and push method.

With reference to FIG. 2b there is shown current limiting inductor 403 that may also be connected to the branches. In the shown embodiment, the current limiting inductor 403 is part of integrated controllable capacitor LC circuit module "integrated circuit module" 409 along with current limiting inductor 403 and parallel capacitors 406. However it is possible for the current limiting inductor to be a separate component.

The current limiting inductor 403 may be implemented when the speed of commutation is very fast as a result of the parallel capacitors 406 (as discussed above). The inductor serves to reduce the speed of commutation to prevent damage to other components such as the thyristor valves that may be caused if commutation occurs too quickly due to the use of the parallel capacitor(s) that provide for acceptable harmonic performance.

The current limiting inductor may be required to reduce the rate of rise of on-state current. If the rate of rise of on-state current is too high during commutation, then components such as the thyristor valves may be damaged.

Figure 6B:
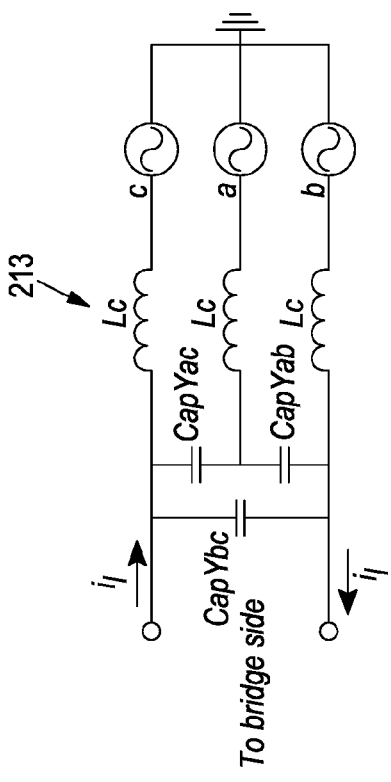
FIG. 6b is a circuit diagram showing an equivalent circuit for when two phases are conducting including a representation of the inductance caused by the transformer according to an embodiment of the present invention including parallel capacitors.

FIG. 6b, showing the equivalent circuit for periods when phase b and phase c are conducting, is used to explain how harmonic reduction can be achieved with the parallel capacitors and taking advantage of the inductance of the transformer.

Two parallel paths can be identified for current coming from the bridge that may be highly distorted with significant harmonic content. A first path is through the parallel capacitors CapYac, CapYbc, CapYab. A second path is through transformer 213 that is represented in FIG. 6b as an inductor in series with each branch. Therefore, it can be seen that the inductance of the second path will be $2L_c$.

The commutation inductance $L_c$ is mainly from the converter transformer and is normally large and fixed. Therefore if the capacitances of the parallel capacitors CapYac, CapYbc, CapYab are appropriately chosen, the impedance of the first path can be smaller than that of the second path at the harmonic frequencies. As a result, the harmonics generated by the bridge that are contained in current $i_c$ are effectively filtered out by the parallel capacitors CapYac, CapYbc, CapYab. As a result there is no need for AC filters that are usually required to filter out such harmonics. As discussed above, there are plenty of advantages associated with the removal of AC filters.

With reference to FIG. 6a and FIG. 6b, it can be seen that the parallel capacitors CapYac, CapYbc, CapYab generate reactive power and export it to the AC network. As discussed above, this removes the need for reactive power compensation devices at the AC side and improves the speed of fault recovery.

Figure 6D:
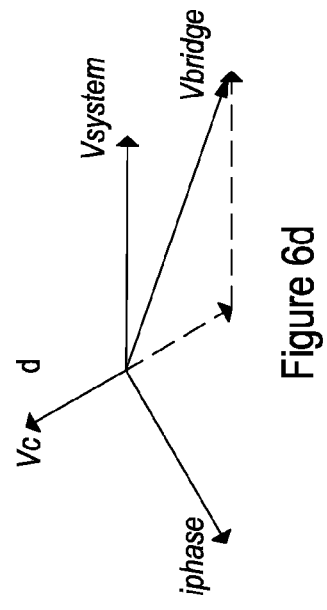
FIG. 6d shows the phasor diagram of the electrical variables associated with the fixed series capacitor.
Figure 6C:
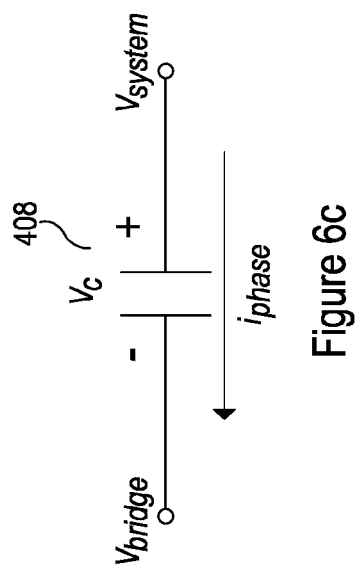
FIG. 6c shows an equivalent circuit of a fixed series capacitor.

With reference to FIGS. 6c and 6d, it is discussed below how the fixed series capacitor module (referenced as 408 in FIG. 2c, and referenced as CYYa, CYYb, CYYc in FIG. 1b) further improves the system. The fixed series capacitor module effectively delays the commutation voltage. This can be explained with reference to FIG. 6c, where Vbridge is the AC voltage at bridge side, Vsystem is the AC voltage at system side, Vc is the voltage across fixed capacitor and iphase is the phase current passing through the fixed series capacitor. Since the firing angle of thyristor valves at the inverter is normally near 180 degrees, iphase lags Vsystem. As a result, according to the phasor diagram in FIG. 6d, Vbridge is lagging Vsystem. As discussed above, this provides for a higher steady-state firing angle leading to a smaller steady-state reactive power consumption of the converter. Furthermore, there is a higher commutation voltage during fault conditions. This further reduces the required voltage level of the insertable-series capacitors.

The reactive power generated during steady-state by the fixed series capacitor further increases the steady-state reactive power export capability of the converter. The reactive power generated during a transient condition further increases the recovery speed of the converter after a fault is cleared.

With reference to FIGS. 3a to 3f there are shown different configurations of components in series with the branches 210, 211, 212 in relation to transformer 213 and in accordance with embodiments of the invention when implemented with a 6-pulse bridge. The representations are relevant for either the inverter or rectifier side of the LCC HVDC system and there may be different advantages associated with different configurations depending on if they are at the inverter or rectifier side. In these embodiments, the current limiting inductor and parallel capacitors are integrated with the insertable-series capacitors in an integrated controllable capacitor LC circuit module 409 as shown in FIG. 2b.

Figure 3A:
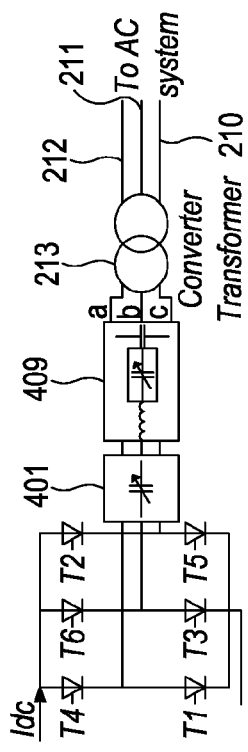
FIG. 3a is a circuit diagram showing components in series with the branches in accordance an embodiment of the present invention in which a controllably insertable capacitor module, an integrated controllable capacitor LC circuit module, and a fixed capacitor module at the AC side of the converter transformer are implemented for a 6-pulse bridge.

FIG. 3a shows controllably insertable capacitor module 401 and integrated controllable capacitor LC circuit module 409 in series with branches 210, 211, 212 on the bridge side of transformer 213. Fixed capacitor module 407 is in series with branches 210, 211, 212 on the AC side of the transformer.

Figure 3C:
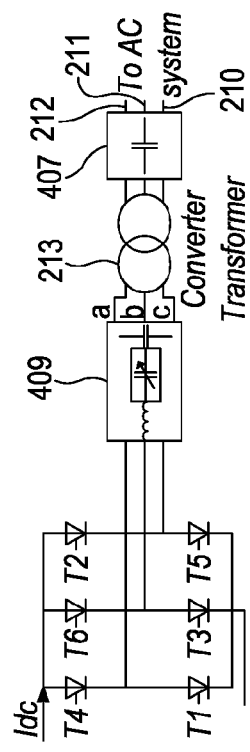
FIG. 3c is a circuit diagram showing components in series with the branches in accordance with an embodiment of the present invention in which a controllably insertable capacitor module and a fixed capacitor module at the AC side of converter transformer are implemented for a 6-pulse bridge.
Figure 3E:
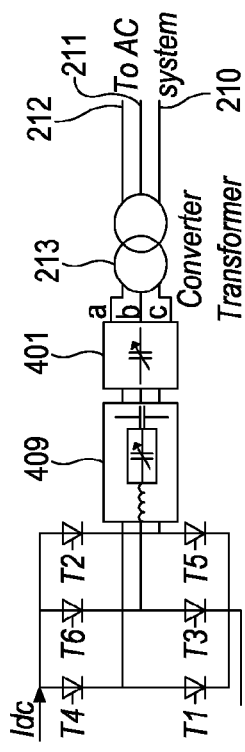
FIG. 3e is a circuit diagram showing components in series with the branches in accordance with an embodiment of the present invention in which a controllably insertable capacitor module, an integrated controllable capacitor LC circuit module, and a fixed capacitor module at the AC side of converter transformer are implemented for a 6-pulse bridge, with an alternative positioning of the controllably insertable capacitor module and integrated controllable capacitor LC circuit module.
Figure 3B:
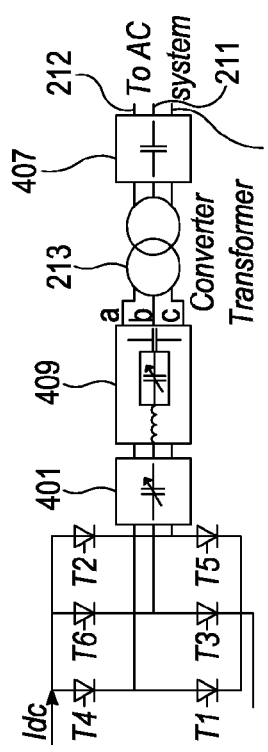
FIG. 3b is a circuit diagram showing components in series with the branches in accordance with an embodiment of the present invention in which a controllably insertable capacitor module and an integrated controllable capacitor LC circuit module are implemented for a 6-pulse bridge.

FIG. 3b shows controllably insertable capacitor module 401 and integrated controllable capacitor LC circuit module 409 in series with branches 210, 211, 212 on the bridge side of transformer 213.

FIG. 3c shows controllably insertable capacitor module 401 in series with branches 210, 211, 212 on the bridge side of transformer 213. Fixed capacitor module 407 is in series with branches 210, 211, 212 on the AC side of the transformer.

Figure 3D:
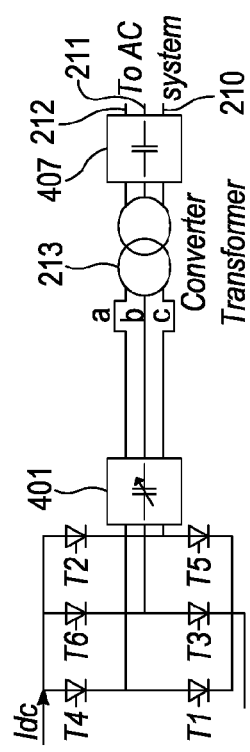
FIG. 3d is a circuit diagram showing components in series with the branches in accordance with an embodiment of the present invention in which an integrated controllable capacitor LC circuit module and a fixed capacitor module at the AC side of converter transformer are implemented for a 6-pulse bridge.

FIG. 3d shows integrated controllable capacitor LC circuit module 409 in series with branches 210, 211, 212 on the bridge side of transformer 213. Fixed capacitor module 407 is in series with branches 210, 211, 212 on the AC side of the transformer.

FIG. 3e shows controllably insertable capacitor module 401 and integrated controllable capacitor LC circuit module 409 in series with branches 210, 211, 212 on the bridge side of transformer 213 in a different order to that shown in FIG. 3a (i.e. the positioning of these components is swapped around compared to the embodiment of FIG. 3a). Fixed capacitor module 407 is in series with branches 210, 211, 212 on the AC side of the transformer.

Figure 3F:
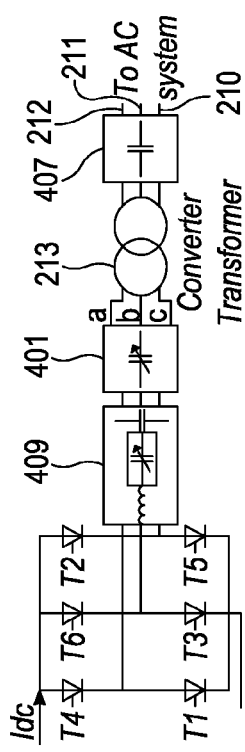
FIG. 3f is a circuit diagram showing components in series with the branches in accordance with an embodiment of the present invention in which a controllably insertable capacitor module and integrated controllable capacitor LC circuit module are implemented for a 6-pulse bridge, with an alternative positioning of the controllably insertable capacitor module and integrated controllable capacitor LC circuit module.

FIG. 3f shows controllably insertable capacitor module 401 and integrated controllable capacitor LC circuit module 409 in series with branches 210, 211, 212 on the bridge side of transformer 213 in a different order to that shown in FIG. 3b (i.e. the positioning of these components is swapped around compared to the embodiment of FIG. 3b).

When the integrated controllable capacitor LC circuit module and/or the fixed series capacitor module are installed at the inverter side as shown in FIGS. 3a, 3d, and 3e, the required voltage level of the controllably insertable capacitor for commutation failure is significantly reduced. Therefore the risk of commutation failure is significantly reduced. This configuration removes the need for AC harmonic filters for the reasons discussed above. Furthermore, the speed of fault recovery is significantly faster for the reasons discussed above.

When the integrated controllable capacitor LC circuit module and/or the fixed series capacitor module are installed at either the rectifier or inverter side as shown in FIGS. 3a, 3d, and 3e, it is possible for the controllably insertable capacitors to be controlled such that a varying extinction angle for the inverter can be achieved, thereby supplying a reactive power to the AC system. Furthermore it is possible for the extinction angle to be negative, thereby supplying positive reactive power to the AC system.

In the proposed approach of HVDC conversion with the series capacitors (407 in FIG. 2c)—when compared to HVDC without the series capacitors—can be configured to further increase the actual commutation voltage during AC faults, in particular during unbalanced AC faults, and also increase the average DC voltage level during AC faults, which leads to increased power transfer of the HVDC system during AC faults. In other words, the installation of the series capacitor minimizes the impact of the AC fault on the DC side. An added value is that the actual commutation voltage will be automatically increased when the AC fault current increases, which therefore further minimizes the adverse impact on the DC system.

The present disclosure also relates to the following numbered clauses. Note that throughout this disclosure, references to "controllable capacitors" relate to the controllably insertable capacitor module comprising insertable-series capacitors.

Clause 1. Disclosed herein is that at least one Integrated Controllable Capacitor and LC Circuit Module is installed for each 6-pulse bridge.

Integrated Controllable Capacitor and LC Circuit Module has the distinguished features: (1) controllable capacitors are connected in series for each phase; (2) the capacitor voltage of the controllable capacitor is very low; (3) the voltage level of the controllable capacitors can be controlled; (4) fixed parallel capacitors are connected between phases (5) current limiting inductors may be connected in series for each phase.

Clause 2. Disclosed herein is that at least one fixed series capacitor module is installed for each 6-pulse bridge Clause 3. The method of Clause 1 can bring the following significant advantages to the HVDC system performance:
 1. Much smaller amount of power electronic switches for the controllable capacitors to elimination commutation failures.
 2. Much lower losses caused by the conduction and switching of power electronic switches
 3. Much improved system reliability due to the decreased number of power electronic switches 4. Much less capital cost due to the decreased number of power electronic switches.
5. Significant harmonic reduction in generated AC current. With suitable capacitance selections, the harmonic level can even be smaller than the harmonic level of LCC HVDC system with AC filters.
6. Significant reduction in high-frequency electro-magnetic field generation. It is because the impedance of capacitor is inversely related to the frequency whilst the impedance of inductor is proportionally related to the frequency, the harmonics are better filtered by the parallel capacitor as frequency increases.
7. Complete elimination of AC filters.
8. Significant reduction of the space required by the converter station. AC filters and the associated switch yard take up a large space of the converter station.
9. Considerable reduction in the converter losses due to the elimination of AC filters.
10. Considerable cost-savings and increase of system reliability due to the elimination of AC filters.
11. Elimination of the potential low-order harmonic resonance problem between AC filter and AC system.

Clause 4. The method of Clause 2 can bring the following significant advantages to the HVDC system performance:
1. Higher steady-state firing angle. This will lead to a smaller steady-state reactive power consumption of converter.
2. Higher commutation voltage during fault conditions. This further reduces the required voltage level of the controllable capacitors.

Clause 5. When the Integrated Controllable Capacitor and LC Circuit Module and/or the fixed series capacitor module are installed for 6-pulse bridges at inverter side, the required voltage level of the controllable capacitor for commutation failure elimination is significantly reduced.

Clause 6. When the Integrated Controllable Capacitor and LC Circuit Module and/or the fixed series capacitor module are installed for 6-pulse bridges at either rectifier/inverter side, by controlling timing of the firing of the power electronic switches in the controllable capacitors such that a varying extinction angle for the inverter can be achieved, thereby supplying a controllable reactive power to the AC system, and even an extinction angle for the inverter can be negative thereby supplying a positive reactive power to the AC system.

Clause 7. When the Integrated Controllable Capacitor and LC Circuit Module and/or the fixed series capacitor module are installed for 6-pulse bridges at inverter side, the effective commutation voltage prevents a commutation failure of the HVDC.

Clause 8. When the Integrated Controllable Capacitor and LC Circuit Module and/or the fixed series capacitor module are installed for 6-pulse bridges at either rectifier/inverter side, AC harmonic levels are significantly reduced.

Clause 9. When the Integrated Controllable Capacitor and LC Circuit Module and/or the fixed series capacitor module are installed for 6-pulse bridges at either rectifier/inverter side, the AC harmonic filters can be eliminated.

Clause 10. When the Integrated Controllable Capacitor and LC Circuit Module and/or the fixed series capacitor module are installed for 6-pulse bridges at either rectifier/inverter side, the speed of fault recovery is significantly faster.

The present disclosure also relates to the following lettered clauses:

A. Disclosed herein is that at least one Integrated Controllable Capacitor and LC Circuit Module is installed for each 6-pulse bridge.
Integrated Controllable Capacitor and LC Circuit Module has the distinguished features: (1) controllable capacitors are connected in series for each phase; (2) GCS is used to achieve the active capacitor insertion based on either half-bridge configuration or full-bridge configuration; (3) the capacitor voltage of the controllable capacitor is very low; (4) the voltage level of the controllable capacitors can be controlled; (4) fixed parallel capacitors are connected between phases; (6) current limiting inductors may be connected in series for each phase.

B. Disclosed herein is that at least one fixed series capacitor module is installed for each 6-pulse bridge converter C. The method of Clause A can bring following significant advantages to the HVDC system performance:
1. Much smaller amount of GCS (for instance power electronic switches) for the controllable capacitors to elimination commutation failures.
2. Much lower losses caused by the conduction and switching of GCS (power electronic switches)
3. Much improved system reliability due to the decreased number and voltage rating of GCS (for instance power electronic switches)
4. Much less capital cost due to the decreased number and voltage rating of GCS (for instance power electronic switches).
5. Significant harmonic reduction in generated AC current. With suitable capacitance selections, the harmonic level can even be smaller than the harmonic level of LCC HVDC system with AC filters.
6. Significant reduction in high-frequency electro-magnetic field generation. It is because the impedance of capacitor is inversely related to the frequency whilst the impedance of inductor is proportionally related to the frequency, the harmonics are better filtered by the parallel capacitor as frequency increases.
7. Complete elimination of AC filters.
8. Significant reduction of the space required by the converter station. AC filters and the associated switch yard take up a large space of the converter station.
9. Considerable reduction in the converter losses due to the elimination of AC filters.
10. Considerable cost-savings and increase of system reliability due to the elimination of AC filters.
11. Elimination of the potential low-order harmonic resonance problem between AC filter and AC system.
12. Cost reduction, loss reduction, and increase of reliability of converter transformers due to the much lower harmonic current flowing through it.

D. The method of Clause B can bring following significant advantages to the HVDC system performance:
1. Higher steady-state firing angle. This will lead to a smaller steady-state reactive power consumption of converter.
2. Higher commutation voltage during fault conditions. This further reduces the required voltage level of the controllable capacitors.

E. When the Integrated Controllable Capacitor and LC Circuit Module and/or the fixed series capacitor module are installed for 6-pulse bridges at inverter side, the required voltage level of the controllable capacitor for commutation failure elimination is significantly reduced.

F. When the Integrated Controllable Capacitor and LC Circuit Module and/or the fixed series capacitor module are installed for 6-pulse bridges at either rectifier/inverter side, by controlling timing of the firing of the power electronic switches in the controllable capacitors such that a varying extinction angle for the inverter can be achieved, thereby supplying a controllable reactive power to the AC system, and even an extinction angle for the inverter can be negative thereby supplying a positive reactive power to the AC system.

G. When the Integrated Controllable Capacitor and LC Circuit Module and/or the fixed series capacitor module are installed for 6-pulse bridges at inverter side, the effective commutation voltage prevents a commutation failure of the HVDC.

H. When the Integrated Controllable Capacitor and LC Circuit Module and/or the fixed series capacitor module are installed for 6-pulse bridges at either rectifier/inverter side, AC harmonic levels are significantly reduced.

I. When the Integrated Controllable Capacitor and LC Circuit Module and/or the fixed series capacitor module are installed for 6-pulse bridges at either rectifier/inverter side, the AC harmonic filters can be eliminated.

J. When the Integrated Controllable Capacitor and LC Circuit Module and/or the fixed series capacitor module are installed for 6-pulse bridges at either rectifier/inverter side, the speed of fault recovery is significantly faster.

K. With the Integrated Controllable Capacitor and LC Circuit Module and/or the fixed series capacitor module are installed for 6-pulse bridges at either rectifier/inverter side, the costs of converter transformers would be reduced.

The invention claimed is:

1. A line commutated converter, LCC, for a high-voltage direct current power converter, the LCC comprising at least one LCC bridge circuit for connection to at least one terminal of a DC system, each bridge circuit comprising at least two arms, each arm associated with a phase of an AC system, each arm comprising:
    one or more upper thyristor valves and one or more lower thyristor valves connected in series;
    a branch associated with the upper and lower thyristor valves extending from between the upper and lower thyristor valves;
    a parallel capacitor module comprising at least one parallel capacitor being connected in parallel between at least one pair of branches comprising a first branch and a second branch wherein during commutation of a flow of current in the first branch to a flow of current in the second branch, the at least one parallel capacitor is configured to discharge current into the second branch in the same direction as the flow of current in the second branch; and
    the at least one parallel capacitor having a discharging loop through either i) the upper thyristor valves associated with the first and second branches, or, ii) the lower thyristor valves associated with the first and second branches.

2. The line commutated converter of claim 1 further comprising a first controllably insertable capacitor module, wherein the first controllably insertable capacitor module is operable to insert at least one first insertable-series capacitor in series with each branch.

3. The line commutated converter of claim 1 further comprising an inductor module comprising at least one current limiting inductor in series with each branch, the inductor module configured to reduce the time period taken for commutation between thyristor valves to complete.

4. The line commutated converter of claim 2 further comprising an integrated controllable capacitor LC circuit module comprising the first controllably insertable capacitor module, an inductor module, and the parallel capacitor module.

5. The line commutated converter of claim 4 further comprising at least one second controllably insertable capacitor module wherein the second controllably insertable capacitor module is operable to insert at least one second insertable-series capacitor in series with each branch.

6. The line commutated converter of claim 1 further comprising a fixed capacitor module comprising at least one fixed-series capacitor in series with each branch and configured for generating reactive power.

7. The line commutated converter of claim 1 wherein the bridge circuit is connected to the AC system via at least one transformer; and each branch extends beyond the at least one transformer to a connection to at least one terminal of the AC system.

8. The line commutated converter of claim 7 wherein the capacitances of the parallel capacitor module are selected so that a first electrical path through the parallel capacitor module has a lower impedance at harmonic frequencies than a second electrical path through the transformer to the AC system in order to restrict the transmission of harmonic frequencies to the AC system.

9. The line commutated converter of claim 7 wherein the fixed capacitor module is in series between the at least one transformer and the at least one terminal of the AC system.

10. The line commutated converter of claim 1 wherein the AC system comprises three phases, and the parallel capacitor module comprises three parallel capacitors, wherein;
    a first parallel capacitor is connected between a first branch and a second branch;
    a second parallel capacitor is connected between the second branch and a third branch;
    a third parallel capacitor is connected between the first branch and the third branch.

11. The line commutated converter of claim 1 comprising two LCC bridge circuits connected in series, each LCC bridge circuit being a six-pulse bridge circuit having three phases.

12. The line commutated converter of claim 1 wherein the branches make up a first set of branches, and further comprising a second set of branches having the same number of branches as the first set of branches, and wherein;
    each branch of the second set of branches is connected in parallel with a corresponding branch in the first set of branches; and
    all parallel capacitors are connected between branches that are within the same set.

13. The line commutated converter of claim 12, wherein the bridge circuit is connected to the AC system via at least one transformer; and each branch extends beyond the at least one transformer to a connection to at least one terminal of the AC system, and, wherein each set of branches is connected to the AC system via one transformer.

14. A method of operating a line commutated converter as described in claim 1,
    the method comprising the step of;
    discharging current from the at least one parallel capacitors and thereby providing a first additional commutation current.

15. The method of claim 14 further comprising the step of inserting at least one insertable-series capacitor in series with each branch during commutation to provide a second additional commutation current.

16. The method of claim 14 wherein the line commutated converter further comprises an inductor module comprising at least one current limiting inductor in series with each branch, and wherein the method further comprises the step of reducing the time period taken for commutation between thyristor valves to complete.

17. The method of claim 14 further comprising the step of restricting transmission of harmonic frequencies to the AC system by selecting the capacitance of the at least one parallel capacitors so that a first electrical path through the parallel capacitor module has a lower impedance at the harmonic frequencies than a second electrical path through a transformer to the AC system.

18. The method of claim 14 wherein the line commutated converter further comprises a fixed capacitor module comprising at least one fixed-series capacitor in series with each branch and wherein the method further comprises the step of generating reactive power using the fixed capacitor module.

19. The method of claim 18, further comprising, during an AC fault, one or more of: (i) increasing the actual commutation voltage with increased AC fault current; (ii) increasing the average DC voltage; and (iii) increasing the active power transfer.

20. The method of claim 19 wherein the one or more of steps (i), (ii) and (iii) are performed during an unbalanced AC fault.

\* \* \* \* \*